(12) United States Patent
Hurst et al.

(10) Patent No.: US 9,347,840 B2
(45) Date of Patent: May 24, 2016

(54) TWO DIMENSIONAL MATERIAL-BASED PRESSURE SENSOR

(71) Applicant: Kulite Semiconductor Products, Inc., Leonia, NJ (US)

(72) Inventors: Adam Hurst, New York, NY (US); Arend Van Der Zande, New York, NY (US); James Hone, New York, NY (US)

(73) Assignees: Xulite Semiconductor Products, Inc., Leonia, NJ (US); The Trustees of Columbia University in the City of New York, New York, NY (US)

( * ) Notice: Subject to any disclaimer, the term of this patent is extended or adjusted under 35 U.S.C. 154(b) by 18 days.

(21) Appl. No.: 14/334,923

(22) Filed: Jul. 18, 2014

(65) Prior Publication Data

US 2015/0020610 A1    Jan. 22, 2015

Related U.S. Application Data

(60) Provisional application No. 61/847,788, filed on Jul. 18, 2013.

(51) Int. Cl.
| | | |
|---|---|---|
| G01L 1/16 | (2006.01) | |
| G01L 1/22 | (2006.01) | |
| G01L 1/20 | (2006.01) | |
| G01L 1/14 | (2006.01) | |

(52) U.S. Cl.
CPC .............. *G01L 1/225* (2013.01); *G01L 1/146* (2013.01); *G01L 1/205* (2013.01); *G01L 1/2287* (2013.01)

(58) Field of Classification Search
CPC ......... G01L 9/0073; G01L 9/12; G01L 1/225; G01L 1/205; H01L 29/84
USPC ...................................... 73/777, 780, 862.68
See application file for complete search history.

(56) References Cited

U.S. PATENT DOCUMENTS

| | | | | |
|---|---|---|---|---|
| 2007/0025570 A1* | 2/2007 | Yonehara | ............... | H04R 19/04 381/174 |
| 2007/0121972 A1* | 5/2007 | Suzuki | .................. | B81B 3/0072 381/174 |
| 2008/0308148 A1* | 12/2008 | Leidholm | .............. | B82Y 10/00 136/256 |
| 2011/0041890 A1* | 2/2011 | Sheats | ............. | H01L 31/022433 136/244 |
| 2011/0115055 A1* | 5/2011 | Niide | .................... | H01L 25/167 257/603 |
| 2011/0261987 A1* | 10/2011 | Nakanishi | .............. | H04R 19/04 381/355 |
| 2013/0126994 A1* | 5/2013 | Hwang | ................. | G01L 9/0042 257/419 |

* cited by examiner

*Primary Examiner* — Max Noori
(74) *Attorney, Agent, or Firm* — Troutman Sanders LLP; James E. Schutz; Mark Lehi Jones

(57) ABSTRACT

This disclosure provides example methods, devices, and systems for a two dimensional material-based pressure sensor. A sensor device is provided that includes a substrate having a back electrode, a conductive layer in communication with the back electrode, and an insulating layer coupled to the conductive layer. The insulating layer includes one or more cavity regions. A sensor membrane comprising a two-dimensional material is disposed adjacent to the insulating layer and covering at least one of the one or more cavity regions. A first sensing electrode is in electrical communication with a first region of the sensor membrane, and a second sensing electrode is in communication with a second region of the sensor membrane. The sensor membrane is configured to respond to pressure changes exerted on the sensor device.

25 Claims, 11 Drawing Sheets

TWO DIMENSIONAL MATERIAL-BASED PRESSURE SENSOR

RELATED APPLICATIONS

This application is related to U.S. Provisional Patent Application Ser. No. 61/847,788, filed on Jul. 18, 2013, entitled: "Two Dimensional Material-Based Pressure Sensor," the contents of which are hereby incorporated by reference in their entirety as if presented herein in full.

TECHNICAL FIELD

This disclosure generally relates to pressure sensors and more particularly to a two-dimensional material-based pressure sensor.

BACKGROUND

Two dimensional materials include materials where one dimension is at the atomic scale. Such materials include but are not limited to graphene, molybdenum disulfide ($MoS_2$), titanium disulfide ($TiS_2$) and other like materials. These two dimensional materials have been demonstrated to possess excellent mechanical and electrical properties which make them useful nano-scale sensors, including for pressure sensing. For example, Graphene has a Young's modulus of one terapascal (1 TPa) and has been demonstrated to be impermeable to gases, such as described in Lee, C., et al., *Measurement of the Elastic Properties and Intrinsic Strength of Monolayer Graphene*, Science, 2008, 321(5887), p. 385-388, and Bunch, J. S., et al., *Impermeable atomic membranes from graphene sheets*, Nano Letters, 2008, 8(8): p. 2458-2462. Graphene has further been demonstrated to be a zero-band gap semiconductor with useful transconductive properties, such as described in Dean, C. R., et al., *Boron nitride substrates for high-quality graphene electronics*, Nature Nanotechnology, 2010, 5(10): p. 722-726, and Petrone, N., et al., *Chemical Vapor Deposition-Derived Graphene with Electrical Performance of Exfoliated Graphene*, Nano Letters, 2012, 12(6): p. 2751-2756. Such properties may be used to fabricate a two dimensional material-based pressure sensor.

Graphene is a single atomic layer of carbon atoms closely packed in a honeycomb lattice, such as described in Geim, A. K. and K. S. Novoselov, *The rise of graphene*, Nature Materials, 2007, 6(3): p. 183-191. Further, graphene possesses unique mechanical and electrical properties that makes it well suited for nano-scale sensors. Graphene is the strongest known material with a Young's modulus of one terapascal (1 TPa) and the ability to withstand strains on the order of twenty percent (20%), such as described in Lee, C., et al., *Measurement of the Elastic Properties and Intrinsic Strength of Monolayer Graphene*, Science, 2008, 321(5887), p. 385-388. Moreover, as a true two-dimensional material, it has virtually no bending stiffness and, thus, acts as an ideal membrane, such as described in Lee, C., et al., *Measurement of the Elastic Properties and Intrinsic Strength of Monolayer Graphene*, Science, 2008, 321(5887), p. 385-388, and Freund, L. B. and S. Suresh, *Thin film materials: stress, defect formation, and surface evolution,* 1st pbk. ed 2009, Cambridge, England; N.Y.: Cambridge University Press, xviii, p. 750. Further, graphene membranes have been shown to be impermeable to gases and may withstand large pressures prior to breaking, delamination, or slipping, as described in Bunch, J. S., et al., *Impermeable atomic membranes from graphene sheets*, Nano Letters, 2008, 8(8): p. 2458-2462, and Bunch, J. S. and M. L. Dunn, *Adhesion mechanics of graphene membranes*, Solid State Communications, 2012, 152(15): p. 1359-1364. These properties combine to make graphene an appropriate material for pressure sensing applications, such as described in Bunch, J. S., et al., *Impermeable atomic membranes from graphene sheets*, Nano Letters, 2008, 8(8): p. 2458-2462, and Koenig, S. P., et al., *Ultrastrong adhesion of graphene membranes*, Nature Nanotechnology, 2011, 6(9): p. 543-546, and Bunch, J. S. and M. L. Dunn, *Adhesion mechanics of graphene membranes*, Solid State Communications, 2012, 152(15): p. 1359-1364.

While the unique mechanical properties of graphene may enable the ability to fabricate diaphragm-based pressure sensors which may withstand large, pressure-induced mechanical deflections, the ability to sense these changes may not be achieved through a piezoresistive effect common to most pressure transducers. Graphene may not exhibit a significant piezoresistive effect with applied strain, as shown with both Raman spectroscopy and in-situ nanoindentation measurements, as described in Huang, M., et al., *Electronic—Mechanical Coupling in Graphene from in situ Nanoindentation Experiments and Multiscale Atomistic Simulations*, Nano Letters, 2011, 11(3): p. 1241-1246, and Huang, M., et al., *Phonon softening and crystallographic orientation of strained graphene studied by Raman spectroscopy*, Proceedings of the National Academy of Sciences of the United States of America, 2009, 106(18): p. 7304-7308. These experiments report a gauge factor of one and nine-tenths (1.9) for graphene, which is equivalent to that of a metal foil strain gauge, as described in Huang, M., et al., *Electronic—Mechanical Coupling in Graphene from in situ Nanoindentation Experiments and Multiscale Atomistic Simulations*, Nano Letters, 2011, 11(3): p. 1241-1246, and Barlian, A. A., et al., *Review: Semiconductor Piezoresistance for Microsystems*, Proceedings of the IEEE, 97(3): p. 513-552. A low gauge factor may be expected as graphene is a zero bandgap semiconductor with a symmetric lattice and, as it is bi-axially strained at relatively low levels, there should only be a resistance change based upon a change in geometry, which is the same mechanism in a metallic strain gauge. Alternatively, a semiconductor strain gauge made of silicon, for example, will exhibit piezoresistive gauge factors on the order of two hundred (200) due to the fact that there is a significant change in silicon's mobility with strain, as described in Barlian, A. A., et al., *Review: Semiconductor Piezoresistance for Microsystems*, Proceedings of the IEEE, 97(3): p. 513-552.

While graphene may not possess a high gauge factor, it does exhibit significant changes in conductivity with an applied electric field. Changes in the applied electric field may increase or decrease the carrier concentration in graphene, which may directly change the resistance of the graphene, as described in Tan, Y.-W., et al., *Measurement of scattering rate and minimum conductivity in graphene*, Physical Review Letters, 2007, 99(24): p. -. One of the advantages of transconductance-based sensing is the potential for substantially higher sensitivities, as the change in resistance of a device with an applied electric field has been observed to be more than one thousand percent (1,000%), as described in Petrone, N., et al., *Chemical Vapor Deposition-Derived Graphene with Electrical Performance of Exfoliated Graphene*, Nano Letters, 2012, 12(6): p. 2751-2756. Conventional sensing methods such as piezoresistance may typically exhibit changes in resistance on the order of two percent (2%) to ten percent (10%) and may be material limited to relatively low strain levels of less than one percent (1%), as described in Barlian, A. A., et al., *Review: Semiconductor Piezoresistance for Microsystems*, Proceedings of the IEEE, 97(3): p. 513-552.

Transduction methods of measuring pressure may include a piezoelectric method, an optical method, and a capacitive method. Pressure transducers are typically large with diaphragm sizes on the order of about five hundred microns (500 µm) to five millimeters (5 mm), as described in Barlian, A. A., et al., *Review: Semiconductor Piezoresistance for Microsystems*, Proceedings of the IEEE, 97(3): p. 513-552, and Senturia, S. D., *Microsystem design* 2001, Boston: Kluwer Academic Publishers, xxvi, p. 689, and Baxter, L. K. and IEEE Industrial Electronics Society, *Capacitive sensors: design and applications*, IEEE Press series on electronics technology1 997, New York: IEEE Press. xiv, p. 302. Such diaphragm dimensions may be needed to achieve sufficient electrical signals from pressure changes. Further, such diaphragm dimensions may be constrained by material properties and fabrication. For example, silicon may not be consistently micro-machined as an unsupported, pressure sensitive diaphragm to a single atomic layer. These limitations may result in a limit to the spatial resolution of pressure that may be measured. They further limit the frequency response of the transducer, as pressure transducer, no matter what method of transduction, respond as second-order under-damped, spring-mass-damper systems with typical resonant frequencies from about one kilo-Hertz (1 kHz) to about one mega-Hertz (1 MHz). It should be recognized that frequencies of greater than about one mega-Hertz (1 MHz) may only be achieved for high-pressure piezoresistive and optical-based pressure transducers. The frequency response of diaphragms may be typically taken to be about twenty percent (20%) of the natural frequency of the device, as described in Ogata, K., *Modern control engineering,* 4th ed. 2002, Upper Saddle River, N.J.: Prentice Hall, xi, p. 964. The resonance frequency of the diaphragm may decrease with increasing diaphragm size, which may result in reducing the useable frequency response range of the diaphragm.

BRIEF SUMMARY

Certain example embodiments are disclosed herein for methods, devices, and systems for a two dimensional material-based pressure sensor. A sensor device is provided that includes a substrate having a back-electrode, a conductive layer in communication with the back-electrode, and an insulating layer coupled to the conductive layer. The insulating layer includes one or more cavity regions. A sensor membrane comprising a two-dimensional material is disposed adjacent to the insulating layer and covering at least one of the one or more cavity regions. In certain example implementations, the sensor membrane may be made from a two dimensional material. The sensor device includes a first sensing electrode that is in electrical communication with a first region of the sensor membrane, and a second sensing electrode in communication with a second region of the sensor membrane. The sensor membrane is configured to respond to pressure changes exerted on the sensor device. In certain example implementations, a capacitance change may be measured based on the response of the sensor membrane to pressure changes.

Also disclosed herein is a sensor system that includes a measurement circuit and a sensor in communication with the measurement circuit. The sensor includes a substrate having a back-electrode, a conductive layer in communication with the back-electrode, and an insulating layer coupled to the conductive layer. The insulating layer includes one or more cavity regions. The sensor includes a sensor membrane comprising a two-dimensional material and disposed adjacent to the insulating layer and covering at least one of the one or more cavity regions. A first sensing electrode is in electrical communication with a first region of the sensor membrane, and a second sensing electrode is in communication with a second region of the sensor membrane. The sensor membrane is configured to respond to pressure changes exerted on the sensor device. In certain example implementations, a capacitance change may be measured based on the response of the sensor membrane to pressure changes.

Embodiments of the disclosed technology further include a sensor array system. The sensor array system includes at least one measurement circuit and an array of sensors in communication with the at least one measurement circuit. The array of sensors includes two or more sensors, and each of the two or more sensors include a substrate having a back electrode, a conductive layer in communication with the back electrode, and an insulating layer coupled to the conductive layer. The insulating layer includes one or more cavity regions. A sensor membrane comprising a two dimensional material is disposed adjacent to the insulating layer and covering at least one of the one or more cavity regions. A first sensing electrode is in electrical communication with a first region of the sensor membrane, and a second sensing electrode is in communication with a second region of the sensor membrane. The sensor membrane is configured to respond to pressure changes exerted on the sensor device. In certain example implementations, a capacitance change may be measured based on the response of the sensor membrane to pressure changes.

BRIEF DESCRIPTION OF THE FIGURES

The disclosed technology is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
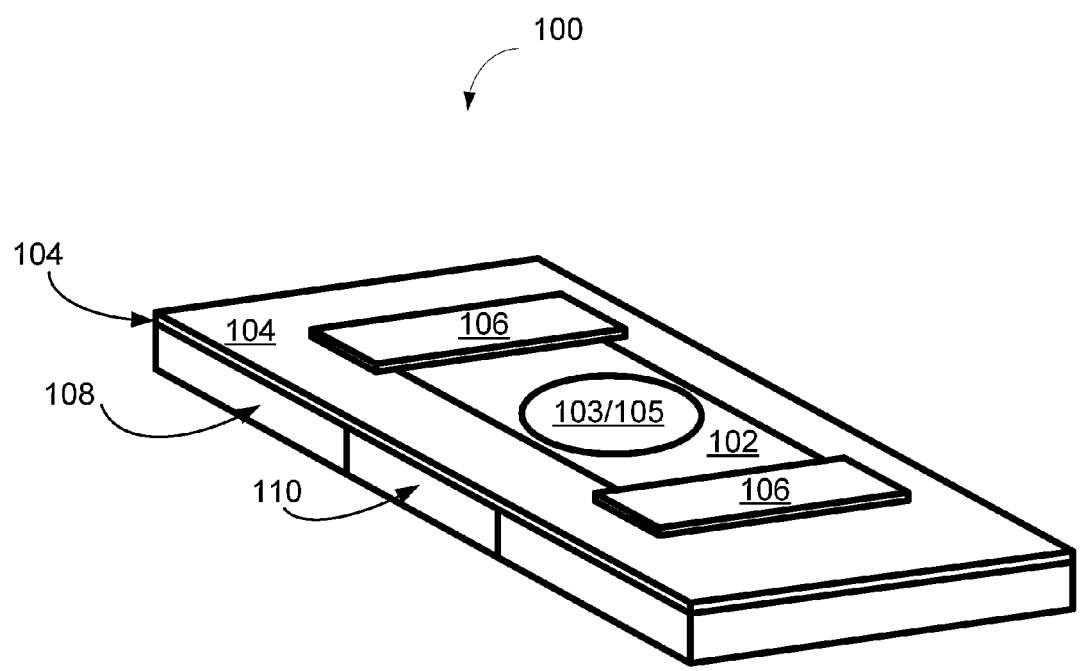
FIG. 1 illustrates a perspective view of one embodiment of a two-dimensional material-based pressure sensor in accordance with various aspects set forth herein.

The following detailed description is illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a pressure sensor. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one implementation," "an implementation," "certain implementations," "one embodiment," "an embodiment," "example embodiment," "various embodiments," and other like terms indicate that the implementations or embodiments of the disclosed technology so described may include a particular function, feature, structure, or characteristic, but not every implementation or embodiment necessarily includes the particular function, feature, structure, or characteristic. Further, repeated use of the phrases "in one implementation," or "in one embodiment" do not necessarily refer to the same implementation or embodiment, although they may.

This disclosure provides example methods, devices, and systems for a pressure sensor. Certain example embodiments disclosed herein may include a sensor device having a sensing membrane suspended on (or over) a substrate structure. In certain example implementations, the sensing membrane may be made from a two-dimensional material. For example, the sensing membrane can include graphene, $MoS_2$, $TiS_2$, or the like. The term "two-dimensional material" is generally utilized to describe material having a thickness of only a single atomic layer. However, the term "two-dimensional material," as used herein, may include membranes having layers of one to several atoms thick. According to an example implementation of the disclosed technology, the substrate structure can include a back-electrode in communication with a conductive layer. In certain example embodiments, the back-electrode may be utilized for controlling an electric potential and/or electric field associated with the device relative to the sensing membrane.

In one example implementation, the conductive layer may be a doped silicon. In one example implementation, a surface of the conductive layer (opposite the back electrode side) may include, may be in contact with, may be coated with, or may otherwise be in communication with a non-conductive insulator layer. In certain example implementations, the non-conductive insulator layer may be silicon dioxide ($SiO_2$), a polymer, or the like.

In certain example implementations, the non-conductive insulator layer may include a cavity region. In certain example implementations, the cavity region can include an array of cavity features. In one example implementation, the array of cavity features may include holes in the non-conductive insulator layer. In another example implementation, the cavity features may include grooves, trenches, or the like. According to certain example implementations of the disclosed technology, the sensor membrane (such as graphene, $MoS_2$, $TiS_2$, or the like) may be suspended over the cavity region of the insulator layer. In certain example implementations, the sensor membrane may be in contact with membrane electrodes that may be used to facilitate making electrical measurements (such as resistance measurements) of the suspended membrane, for example, as a function of strain on the membrane.

Example embodiments of the disclosed technology may utilize the suspended membrane to sense exerted pressure changes on the membrane. For example, and according to one embodiment, a pressure transducer may be configured to include one or more suspended circular graphene membranes over an array of three microns (3 μm) diameter holes in silicon dioxide on degenerately doped silicon. The transconductive nature of graphene may allow the change in pressure to be translated into a change in resistance across the suspended graphene membranes. The pressure-induced deflections of the membrane may vary the distance between the direct current (DC)-biased silicon back-gate and graphene membrane, changing the effective electric field which results in variations in the resistance of the suspended graphene. Experimental results demonstrate that pressure sensors constructed with graphene possess advantages over conventional pressure sensors such as higher sensitivity with diaphragm dimensions over two hundred (200) times smaller than that of typical pressure transducers.

Figure 2:
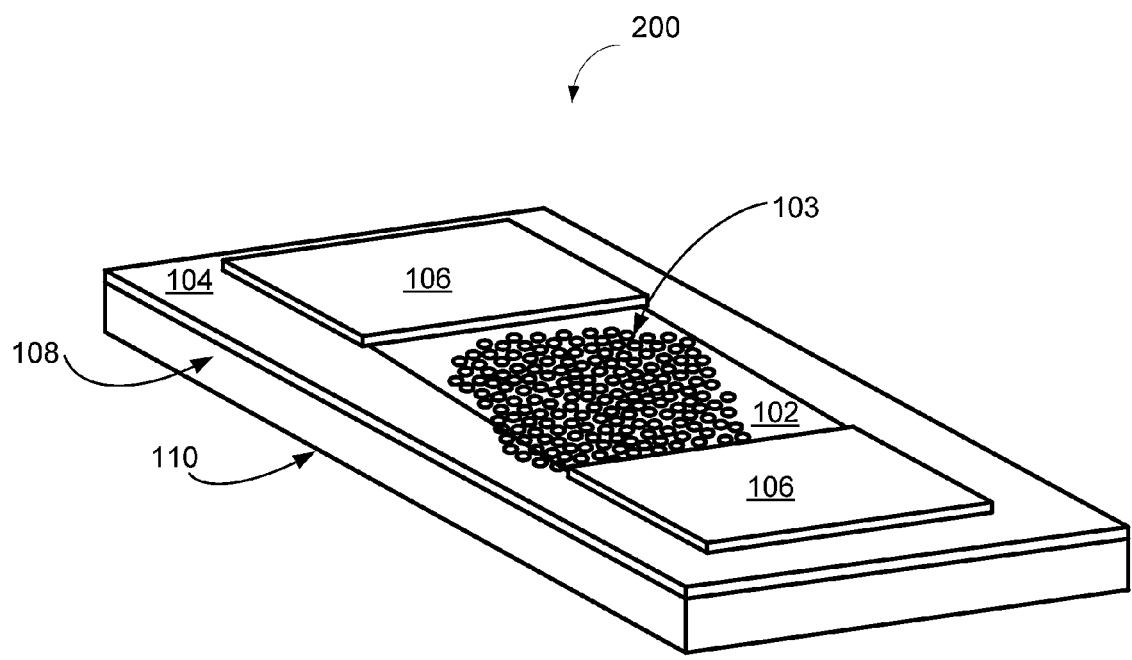
FIG. 2 illustrates a perspective view of another embodiment of a two-dimensional material-based pressure sensor in accordance with various aspects set forth herein.

FIG. 1 provides a perspective view of a two-dimensional material-based pressure sensor 100 with various aspects described herein. In FIG. 1, the pressure sensor 100 may include a two dimensional material as a pressure-sensitive diaphragm or membrane 102. In one example, the two dimensional material may be graphene, $MoS_2$, $TiS_2$ or the like. Such a membrane 102 may be formed by suspending the two dimensional material over one or more cavities 105. In certain example embodiments (and as shown in FIG. 2), the one or more cavities 105 can include one or more nano-to-microsized holes 103, trenches or another like geometry in a non-conductive substrate 104 such that a seal forms over the one or more cavities 105, for example, below the membrane 102. According to certain example implementations, the non-conductive substrate 104 may be silicon dioxide ($SiO_2$), a polymer, or the like. In one example implementation, the edges of the two dimensional material membrane 102 may be secured or sealed using a photoresist such as SU-8, a metal or like material to seal the edges of the two dimensional material.

In an example implementation, conductive contact pads or electrodes 106 (such as metal pads) may be placed at the edges of the one or more cavities 105 to form electrical connections. Further, below the non-conductive substrate 104 may be a conductive layer 108 coupled to a back-electrode 110. In one example, as the two dimensional material membrane 102 deflects a static pressure or a dynamic pressure such as a pressure of at least one-tenth Hertz (0.1 Hz) applied to the membrane 102, a distance between the two dimensional material membrane 102 and the back-electrode 110 changes, creating a change in capacitance between the back-electrode 110 and two dimensional material membrane 102. This may result in multiple methods of transduction that may be measured.

In one example, the frequency of change of the static pressure may be below one-tenth Hertz (0.1 Hz) and the dynamic pressure may be at least one-tenth Hertz (0.1 Hz). In another example, the static pressure may be below one Hertz (1 Hz) and the dynamic pressure may be at least one Hertz (1 Hz). The mechanical displacement of the membrane 102 from pressure may be measured using a capacitance change between the membrane 102 and the back-electrode 110, a resistance change between the membrane 102 and the back-electrode 110 using the transconductive properties of the two dimensional material such as graphene and $MoS_2$, a resistance change between the membrane 102 and the back-electrode 110 using a change in geometry due to the elongation of the membrane 102 (conventional piezoresistive effect, low gauge factor), a resistance change between the membrane 102 and the back-electrode 110 with strain that may exist in some two dimensional materials with a bandgap such as $MoS_2$ (semiconductor piezoresistive effect, high gauge factor) or the like.

In another embodiment, a two dimensional material-based pressure sensor 100 may be fabricated on a flexible polymer substrate. Such fabrication technique may allow for the ability to make an array of sensors. For example, arrays may be made having multiple sensors and/or sensing regions, with the number of sensors ranging in numbers from two (2) to about one million (1,000,000) sensors.

A two dimensional material-based diaphragm may offer advantages over the prior art. First, due to the mechanical properties of two dimensional materials, a size of the diaphragm may be scaled down to about the range of about ten nanometers (10 nm) to about ten microns (10 um) and a thickness of the diaphragm may be reduced down to the atomic limit. At these dimensions and with the higher Young's modulus, such as for graphene, the natural resonance of the diaphragm may reach above one megahertz (1 MHz). The natural resonance of the diaphragm may improve the useable frequency range and decrease the response time of the two dimensional material-based pressure sensor. However, a person of ordinary skill in the art will recognize that the frequency response or response time may be package limited.

Second, the reduced size of the diaphragm may improve the achievable spatial resolution of pressure, which may be useful in applications such as for the aerospace industry and for acoustics. Third, the reduced size of the diaphragm and the structure of the two dimensional material-based pressure sensor may allow for the fabrication of arrays of the two dimensional material-based pressure sensor on a flexible or inflexible substrate for accurate static or dynamic pressure mapping. In one example, such technology may be used to replace pressure belts, which are commonly used to map static and dynamic pressures across airfoils during flight or wind tunnel testing. In addition, the reduced size of the diaphragm may be desirable for consumer electronic applications such as microphones implemented in cell phones.

The unique electrical properties of transduction may offer increased output, as graphene possesses transconductive properties with substantial changes in resistance (1,000%+ typical) with applied gate voltage. Resistance changes may be measured through a simple voltage measurement across, for instance, a Wheatstone bridge. Further, with large deflections achievable, significant changes in capacitance may be achieved. Using such a device as a microphone or pressure sensor for acoustic level pressure may be achieved using a simple direct current (DC) bias to back-electrode and measuring the voltage drop across a resistor as charge moves within the circuit as the capacitance changes with dynamic pressures from the membrane moving with sound waves.

In another embodiment, a two dimensional material-based pressure transducer 100 may include a patterned substrate with a hole, trench or other cavity-based geometry. In another example implementation, a two dimensional material-based pressure transducer 100 may be provided that includes a patterned substrate having an array (or arrays) of multiple holes, trenches or some other cavity-based geometry. In certain example implementations, the patterned substrate may be a micro-patterned substrate or a nano-patterned substrate. In accordance with certain example implementations, the patterned substrate may be solid or flexible.

In another embodiment, a two dimensional material such as graphene, $MoS_2$, $TiS_2$ or a material with like characteristics may be transferred or grown over or into the holes 103, trenches or cavities 105 within the substrate forming a sealed membrane that may deflect with applied pressure.

FIG. 2 illustrates a perspective view of an example embodiment of a two-dimensional material-based pressure sensor 200 in accordance with various aspects set forth herein. In FIG. 2, the pressure sensor 200 may be made by suspending a two dimensional material membrane 102 over an array of holes 103 or trenches to achieve higher sensitivities by a greater change in capacitance.

In both configurations as described in FIG. 1 and FIG. 2, a local or continuous back-electrode 110 may be included. In one example implementation, the local back-electrode 110 may only exist directly underneath the suspended section of the membrane 102 to, for instance, prevent parasitic capacitances, which may be common when a continuous back-electrode 110 is used (i.e., when the substrate 108 is used as the back-electrode 110).

As previously described, multiple methods of transduction from pressure to an electrical signal may be employed. Resistance changes in geometry or a piezoresistive effect in each device may also be used to capture pressure. Capacitance may further be measured in either a dynamic only configuration where the charge oscillating within a circuit from a dynamic pressure is measured as a voltage change across a resistor or it may be directly measured using a change in the time constant of the capacitor or electrical resonance, in which case static and dynamic pressures may be measured.

A two dimensional material-based pressure sensor was fabricated using contact lithography to pattern an array of three micron (3 μm) diameter holes with fifty percent (50%) coverage on a low resistivity (0.001-0.005 Ω-cm) silicon wafer. The holes were etched to a depth of five hundred nanometers (500 nm) using reactive ion etching. A two hundred eighty-five nanometer (285 nm) thick conformal $SiO_2$ epilayer was then grown via dry oxidation in order to electrically isolate the graphene sensor from the silicon wafer, which may be used as a back-gate. The conformal $SiO_2$ epilayer was grown to ensure that the bottom of the holes were also electrically isolated from the back-gate.

Graphene was grown by chemical vapor deposition (CVD) on copper foil with a low methane flow rate (1 sccm) in order to achieve large grain sizes up to two hundred microns (200 μm), as described in Petrone, N., et al., *Chemical Vapor Deposition-Derived Graphene with Electrical Performance of Exfoliated Graphene*, Nano Letters, 2012, 12(6): p. 2751-2756, and Li, X. S., et al., *Large-Area Graphene Single Crystals Grown by Low-Pressure Chemical Vapor Deposition of Methane on Copper*, Journal of the American Chemical Society, 2011, 133(9): p. 2816-2819. Graphene was then transferred onto the patterned substrates using a dry-transfer process.

Figure 3A:
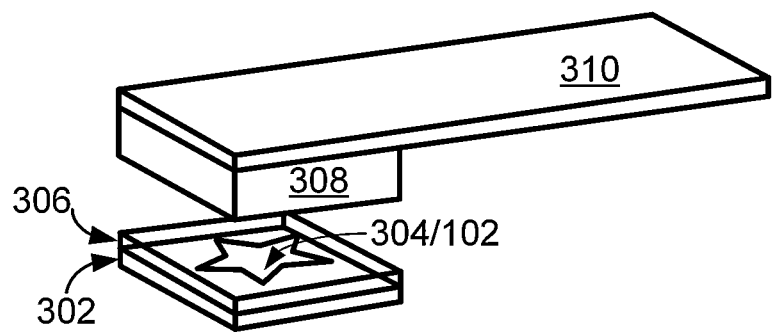
FIG. 3A illustrates a perspective view of one embodiment of a fabrication process step of a two-dimensional material-based pressure sensor in accordance with various aspects set forth herein.

FIGS. 3A-3F illustrate perspective views of corresponding steps of a fabrication process of a two-dimensional material-based pressure sensor in accordance with various aspects and implementations set forth herein. For example, as depicted in FIG. 3A and according to one implementation, after chemical vapor deposition (CVD) graphene 304 growth on copper 302, a poly(methyl methacrylate) (PMMA) film 306 or the like may be spun onto the surface of the graphene 304 to act as a structural support. The PMMA coated foil may be flattened or adhered to a polydimethyl siloxane (PDMS) elastomer stamp 308 or the like, which may in turn be affixed to a glass slide 310 for additional structural support.

Figure 3B:
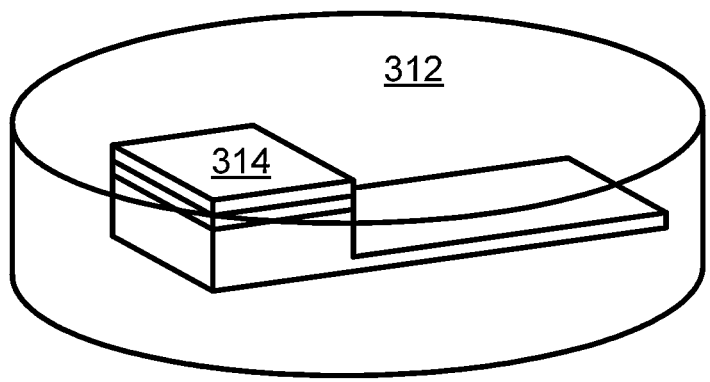
FIG. 3B illustrates a perspective view of one embodiment of a fabrication process step of a two-dimensional material-based pressure sensor in accordance with various aspects set forth herein.

As depicted in FIG. 3B, and according to an example implementation, the copper 302 may then be etched with a copper etchant bath 312, such as APS-100 (Transene) or the like, leaving the PDMS/PMMA-supported graphene resting on the bottom of the bath 312. In an example implementation, the sample 314 may be removed from the etchant bath 312, rinsed in deionized water, and blown dry in a stream of nitrogen ($N_2$) gas or the like.

Figure 3C:
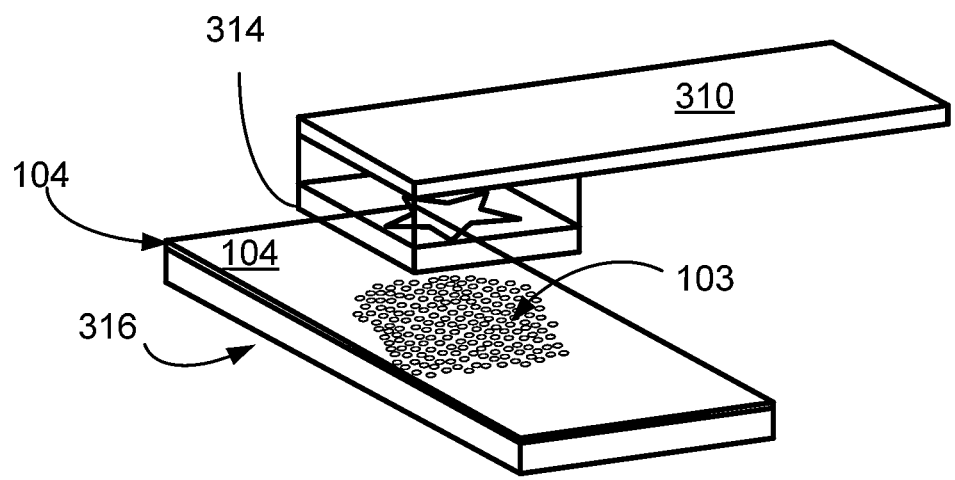
FIG. 3C illustrates a perspective view of one embodiment of a fabrication process step of a two-dimensional material-based pressure sensor in accordance with various aspects set forth herein.

As illustrated in FIG. 3C, and according to an example implementation, the sample 314 may be placed graphene-side down onto the patterned silicon/$SiO_2$ substrate 316 and heated to about one hundred degrees centigrade (100° C.) on, for instance, a hot plate.

Figure 3D:
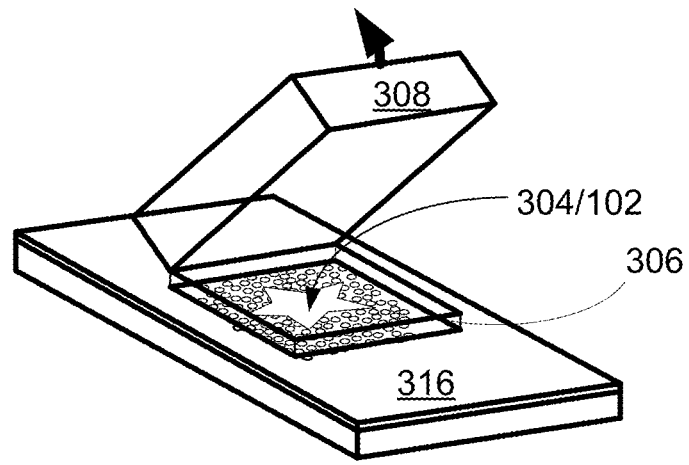
FIG. 3D illustrates a perspective view of one embodiment of a fabrication process step of a two-dimensional material-based pressure sensor in accordance with various aspects set forth herein.
Figure 3E:
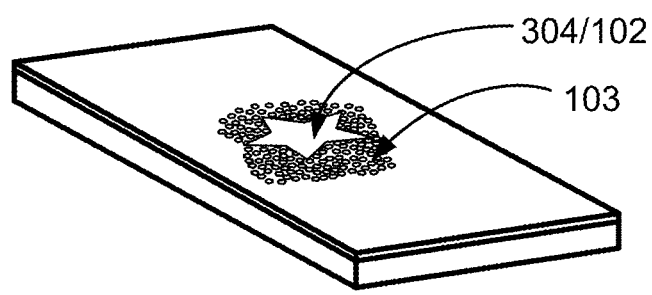
FIG. 3E illustrates a perspective view of one embodiment of a fabrication process step of a two-dimensional material-based pressure sensor in accordance with various aspects set forth herein.
Figure 3F:
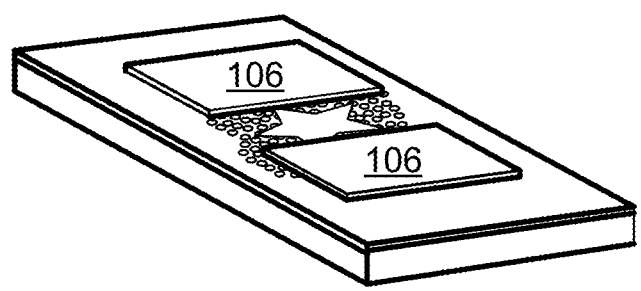
FIG. 3F illustrates a perspective view of one embodiment of a fabrication process step of a two-dimensional material-based pressure sensor in accordance with various aspects set forth herein.

As illustrated in FIG. 3D, and according to an example implementation, the substrate 316 may be heated to about one hundred eighty degrees centigrade (180° C.) prior to removing the PDMS 308, leaving the PMMA 306 coated graphene 304 adhered to the patterned silicon substrate 316. In certain example implementations, the samples may be annealed for about six (6) hours at about three hundred forty-five degrees centigrade (345° C.) in argon-hydrogen (Ar/$H_2$) forming gas to remove the PMMA 306, without collapsing the suspended graphene membranes 102, as illustrated in FIG. 3E. Following the transfer, Ti/Pd/Au (1 nm/10 nm/50 nm) source and drain electrodes 106 may be evaporated onto the edges of the suspended graphene region through, for instance, a shadow mask, as illustrated in FIG. 3F.

Figure 4:
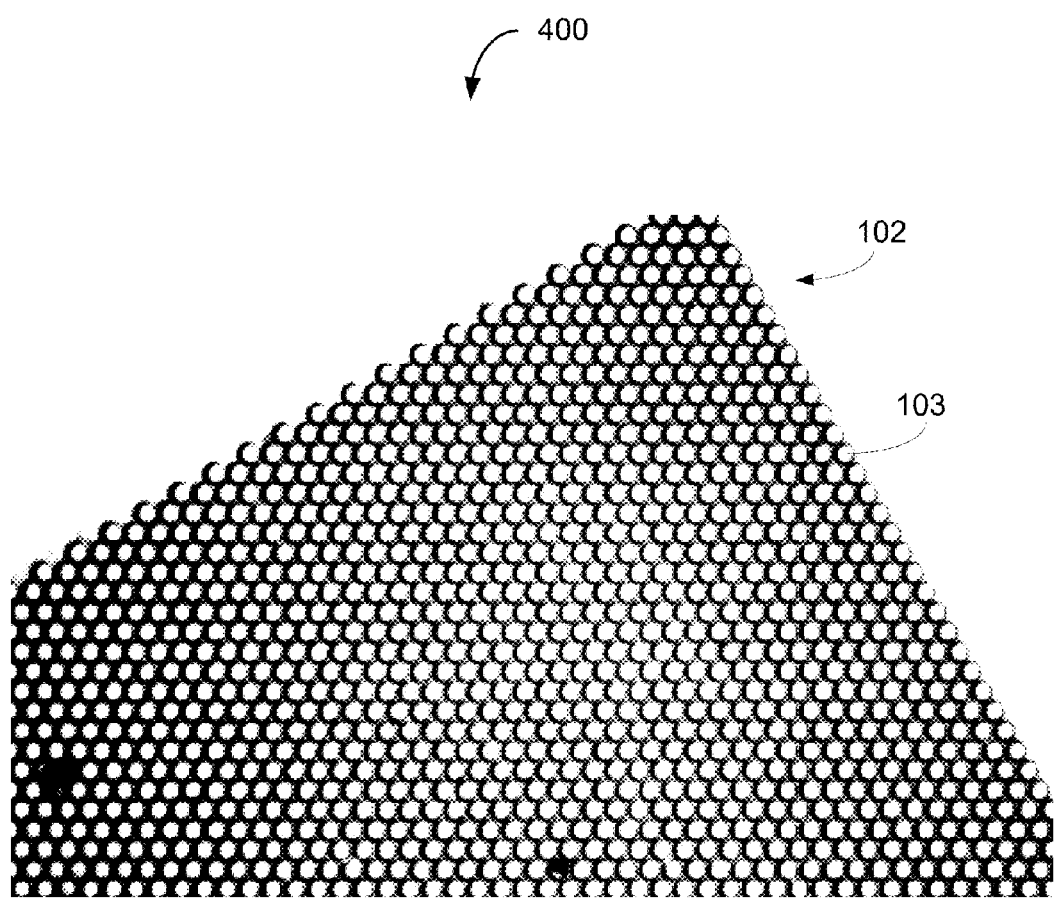
FIG. 4 shows an optical microscope image of chemical vapor deposition (CVD) graphene suspended over holes in silicon dioxide ($SiO_2$) according to an example embodiment of a two dimensional material-based pressure sensor.

FIG. 4 is an optical microscope image 400 of chemical vapor deposition (CVD) graphene membrane 102 suspended over three micron (3 μm) diameter holes 103 in $SiO_2$ of a two dimensional material-based pressure sensor, according to an example implementation of the disclosed technology.

Figure 5:
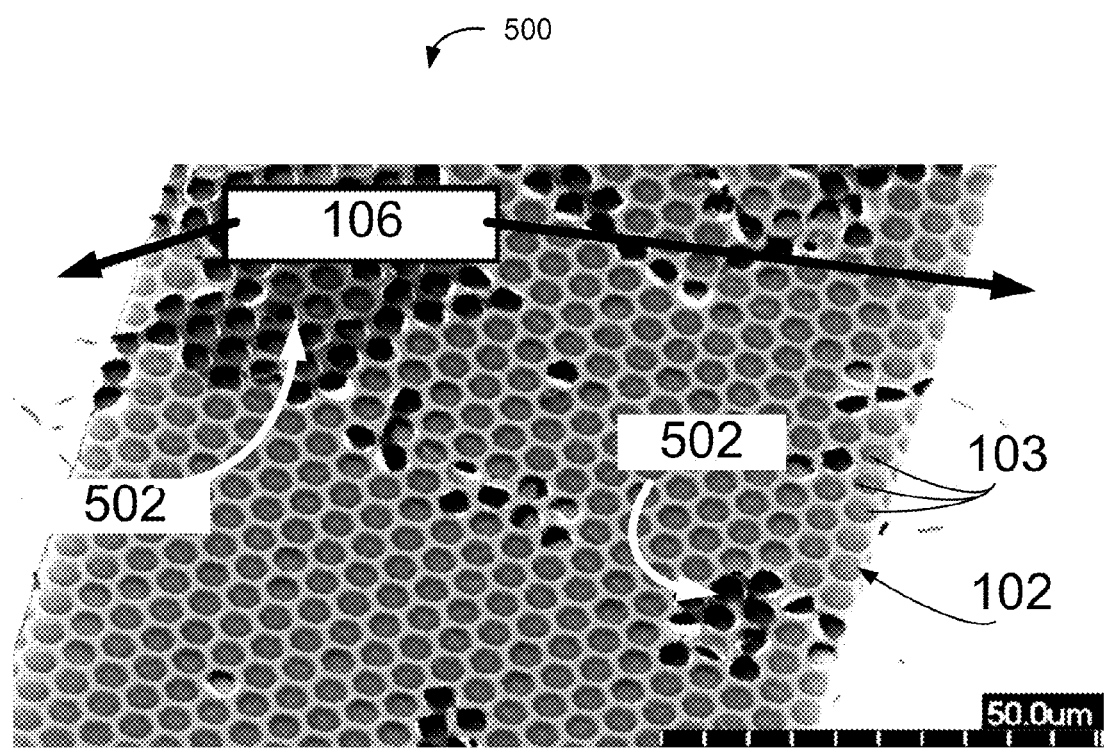
FIG. 5 depicts a scanning electron microscope (SEM) image of a suspended region of graphene with source-drain electrical contact pads on either side of the suspended graphene sheet according to an example implementation of a two dimensional material-based pressure sensor.

FIG. 5 is a scanning electron microscope (SEM) image 500 of a graphene membrane 102 suspended over the insulator layer array of holes 103. Also shown (but may not be completely visible in the image 500) are source-drain electrical contact pads 106 on either side of the suspended graphene membrane 102. Also shown in FIG. 5 are void regions 502 in portions of the graphene membrane 102 where it was damaged in the process.

Figure 6:
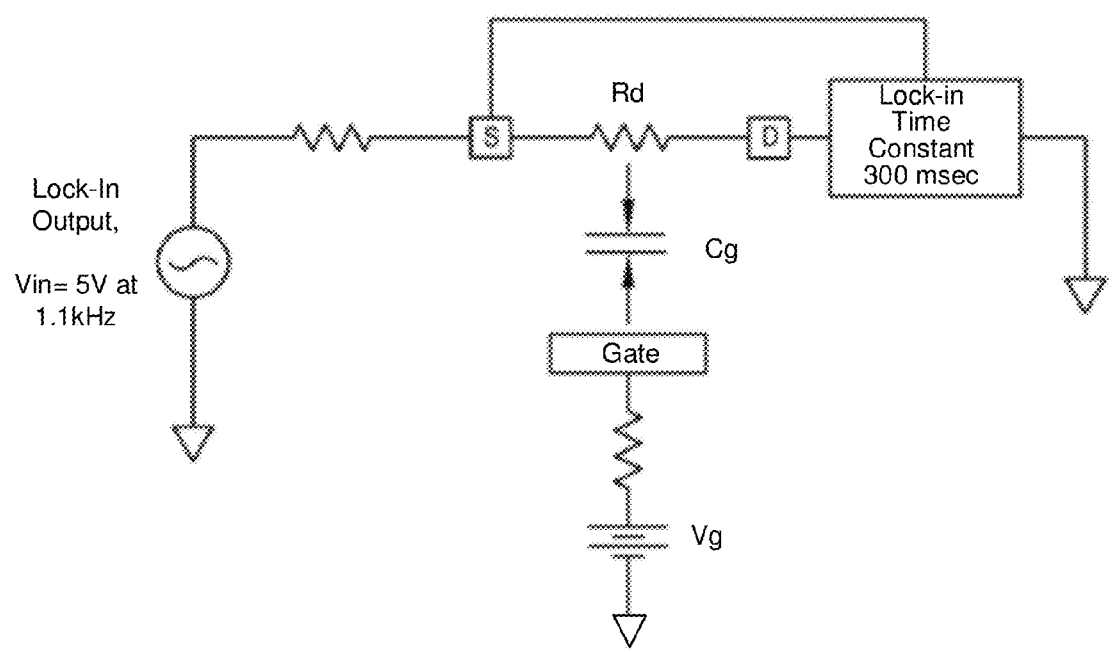
FIG. 6 is a schematic diagram of a circuit used to measure a resistance of a two dimensional material-based pressure sensor.

FIG. 6 is a schematic diagram of a circuit 600 used to measure a resistance of a two dimensional material-based pressure sensor. Prior to testing with pressure, the electrical transport behavior of each device may be studied in order to determine the carrier mobility and intrinsic doping level, as well as to verify that there was no gate leakage. An example implementation of a device was tested and resistance was measured as the gate voltage ($V_g$) (for example, as applied to gate 110 of the device 100 as shown in FIG. 1) was varied from negative thirty volts (−30 V) to thirty volts (30 V) with a constant source-drain bias using the circuit shown in the schematic diagram 600 shown in FIG. 6. The example graphene device resistance Rd (for example, between the two electrodes 106 as shown in FIG. 1) was measured as a function of gate voltage using a voltage divider circuit with an SR830 lock-in amplifier at an excitation voltage of five volts (5V) at one and one-tenth kilohertz (1.1 kHz) across the source drain electrode of the graphene sensor. The conductivity, σ, was calculated as a function of carrier density, n, by applying Equation (1) and Equation (2).

$$\sigma = \frac{1}{R} \cdot \frac{L}{W}, \quad \text{Equation (1)}$$

$$n = \frac{C_g(V_g - V_{Dirac})}{e}, \quad \text{Equation (2)}$$

Figure 7:
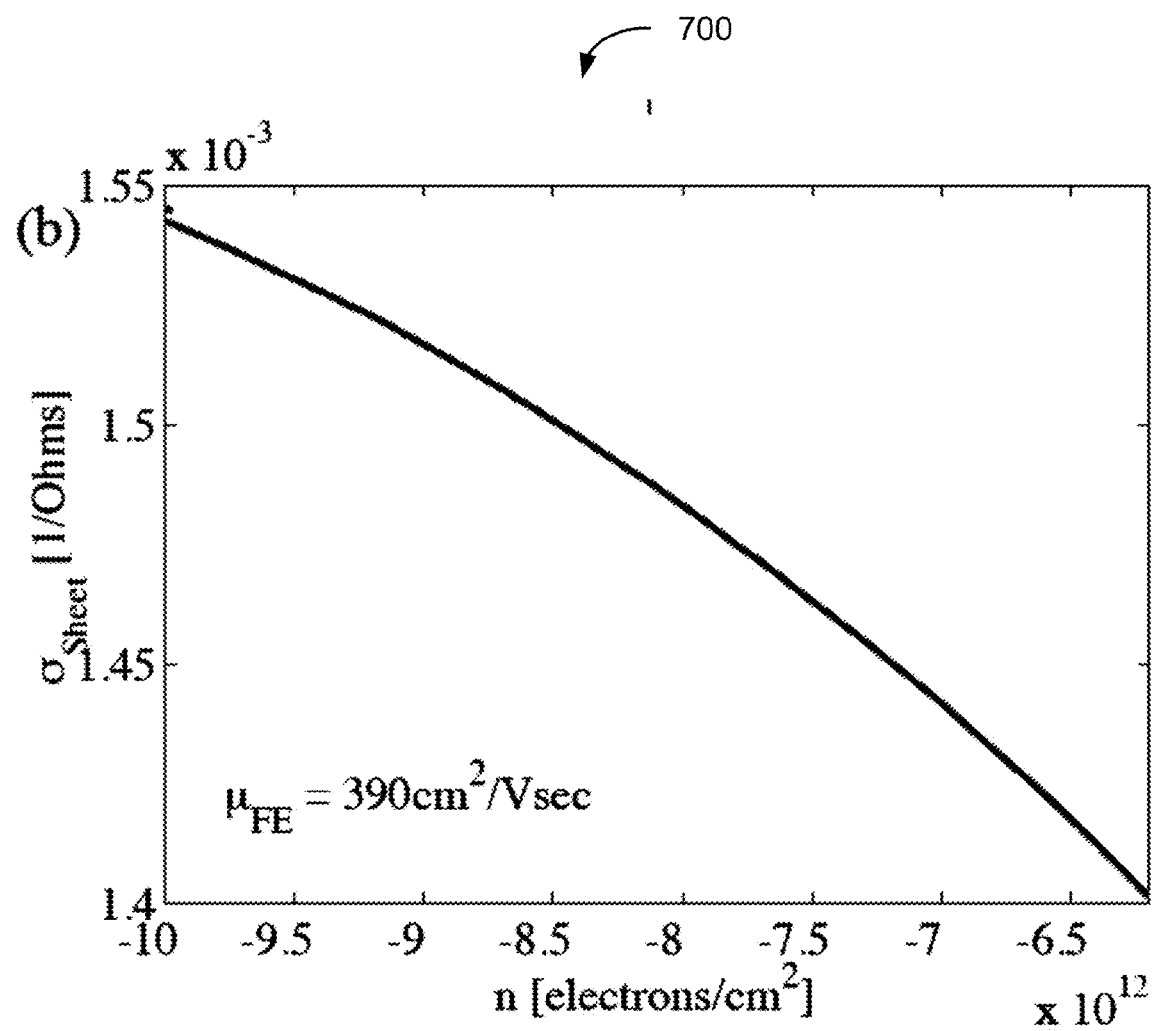
FIG. 7 is a chart of device conductivity as a function of carrier concentration for another embodiment of a two dimensional material-based pressure sensor.

FIG. 7 is a diagram 700 of device conductivity as a function of carrier concentration for another embodiment of a two dimensional material-based pressure sensor.

Utilizing the Drude model, typical field effect mobility, $$\mu_{FE} = \frac{1}{C}\frac{\partial \sigma}{\partial V_g},$$

of the CVD graphene devices were found to be four hundred centimeters squared per volt-second (400 cm$^2$V$^{-1}$s$^{-1}$), as described in Tan, Y.-W., et al., *Measurement of scattering rate and minimum conductivity in graphene*, Physical Review Letters, 2007, 99(24): p. -, and Petrone, N., et al., *Chemical Vapor Deposition-Derived Graphene with Electrical Performance of Exfoliated Graphene*, Nano Letters, 2012, 12(6): p. 2751-2756. This low mobility and the location of the Dirac peak, observed in non-suspended samples to be about one hundred volts (100 V), indicate that the graphene is heavily p-doped, likely resulting from residual ionic dopants from the transfer process and atmospheric adsorbates.

The elastic properties of membranes were also experimentally verified through nano-indentation with an atomic force microscope (AFM). A high spring constant, calibrated AFM tip (42.2 N/m) was used to press on the center of the membrane in order to capture the elastic response of the membrane to the point load. Applying the model as described in Lee, C., et al., *Measurement of the Elastic Properties and Intrinsic Strength of Monolayer Graphene*, Science, 2008, 321(5887): p. 385-388, the two dimensional elastic modulus of the CVD graphene was measured to be three hundred and one Newton per meter (301 N/m) (corresponding to a bulk Young's modulus of 0.90 TPa). The pretension was measured to be about eleven hundredths Newton per meter (0.11 N/m), which is in agreement with pretension values observed by others, such as described in Lee, C., et al., *Measurement of the Elastic Properties and Intrinsic Strength of Monolayer Graphene*, Science, 2008, 321(5887): p. 385-388, Bunch, J. S., et al., *Impermeable atomic membranes from graphene sheets*, Nano Letters, 2008, 8(8): p. 2458-2462, and Bunch, J. S. and M. L. Dunn, *Adhesion mechanics of graphene membranes*, Solid State Communications, 2012, 152(15): p. 1359-1364.

After examining these electrical and mechanical properties separately, the graphene sensor was tested with pressure. The sensor was placed inside a pressure vessel with wire leads from the sensor exiting through an elastic membrane, which was sealed under compression. A Numatics E02 regulator controlled the pressure inside the vessel, which was then accurately measured with a flush mounted reference Kulite piezoresistive XT-190-100 PSI absolute pressure transducer. Using the same wiring schematic as illustrated in FIG. 6, the resistance of the graphene device was measured as the pressure was varied. The graphene sensor was pressurized from atmospheric pressure to 550 kPag (80 psig) at a rate of about 14-21 kPa/msec (2-3 psi/msec). FIG. 7 is a chart of device conductivity as a function of carrier concentration for another embodiment of a two dimensional material-based pressure sensor.

Figure 8:
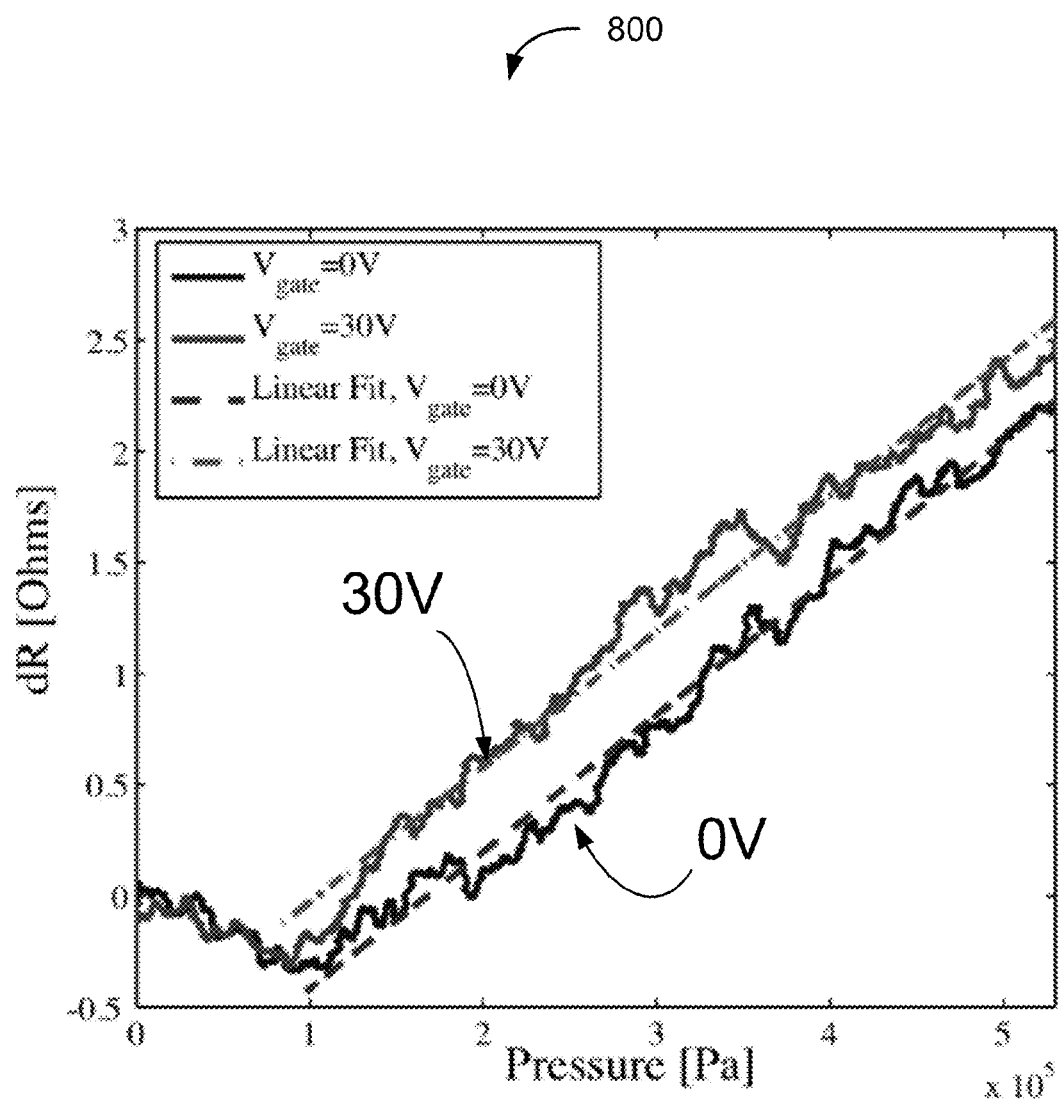
FIG. 8 is a chart of measured resistance changes versus applied pressure at different gate voltages for another embodiment of a two dimensional material-based pressure sensor.

FIG. 8 is a chart 800 of measured resistance changes versus applied pressure at different gate voltages for another embodiment of a two dimensional material-based pressure sensor. These results demonstrate a small gate dependence and a relatively linear resistance change to pressures between 10-50 kPa, with an extracted least squares, linear fit sensitivity of 6.15*10$^{-3}$ Ohms/kPa at $V_g$=0 V and 6.10*10$^{-3}$ Ohms/kPa at $V_g$=30 V.

It should be recognized that the measured resistance characteristics differ from the anticipated response. A straightforward application of the carrier concentration equation for a highly p-doped sheet of graphene may lead to anticipating a non-linear decrease in resistance with increasing pressure, not an increase. Such response may be expected based upon the carrier concentration, as described by Equation 2. As the membrane deflects with pressure and the distance between the gate and membrane decreases, the capacitance and, thus, carrier concentration of the suspended regions is expected to increase. Conductivity, σ, varies with carrier concentration, σ=|μnε|, resulting in an anticipated decrease in device resistance with pressure, as described in Tan, Y.-W., et al., *Measurement of scattering rate and minimum conductivity in graphene*, Physical Review Letters, 2007, 99(24). When these equations are combined with the nonlinear mechanical response of the membrane to pressure, a nonlinear decrease in resistance on the order of 20-30 Ohms may be expected for this 700 Ohm device (about 4%), which is an order of magnitude greater than the magnitude of the measured response, as described in Freund, L. B. and S. Suresh, *Thin film materials: stress, defect formation, and surface evolution*, 1st pbk. ed 2009, Cambridge, England; N.Y.: Cambridge University Press, xviii, p. 750, and Tan, Y.-W., et al., *Measurement of scattering rate and minimum conductivity in graphene*, Physical Review Letters, 2007, 99(24): p. -, and Petrone, N., et al., *Chemical Vapor Deposition-Derived Graphene with Electrical Performance of Exfoliated Graphene*, Nano Letters, 2012, 12(6): p. 2751-2756. While this common model predicts a decrease in resistance, there are several opposing effects likely occurring within the device that may result in a net increase in resistance as observed experimentally. As the membrane deflects and the distance between the membrane and back-electrode decreases, the Dirac peak is expected to narrow and shift in location. Both of these changes are likely to increase the resistance of the graphene membrane. The data exhibits a net increase in resistance suggesting the dominant effect is likely due to these shifts in the Dirac peak over the increase in carrier concentration, as previously postulated.

The observed discrepancy between anticipated and measured pressure response of the device may be derived from a relative difference in resistance between the suspended and substrate-supported regions of the graphene. The suspended sections may be more resistive due to a greater total capacitance than the non-suspended sections, resulting in the suspended sections having a smaller impact on device resistance. The increasing device resistance may be related to, for instance, unanticipated effects from changing gaps or a different phenomenon being observed. It is possible that the observed positive shift in resistance with pressure may be related to the graphene being pressed closer to the oxide in the non-suspended regions creating an unusual surface charge related effect that is dominating the response. It is also possible that resistance may increase due to the elongation of the membranes with pressure.

Figure 9:
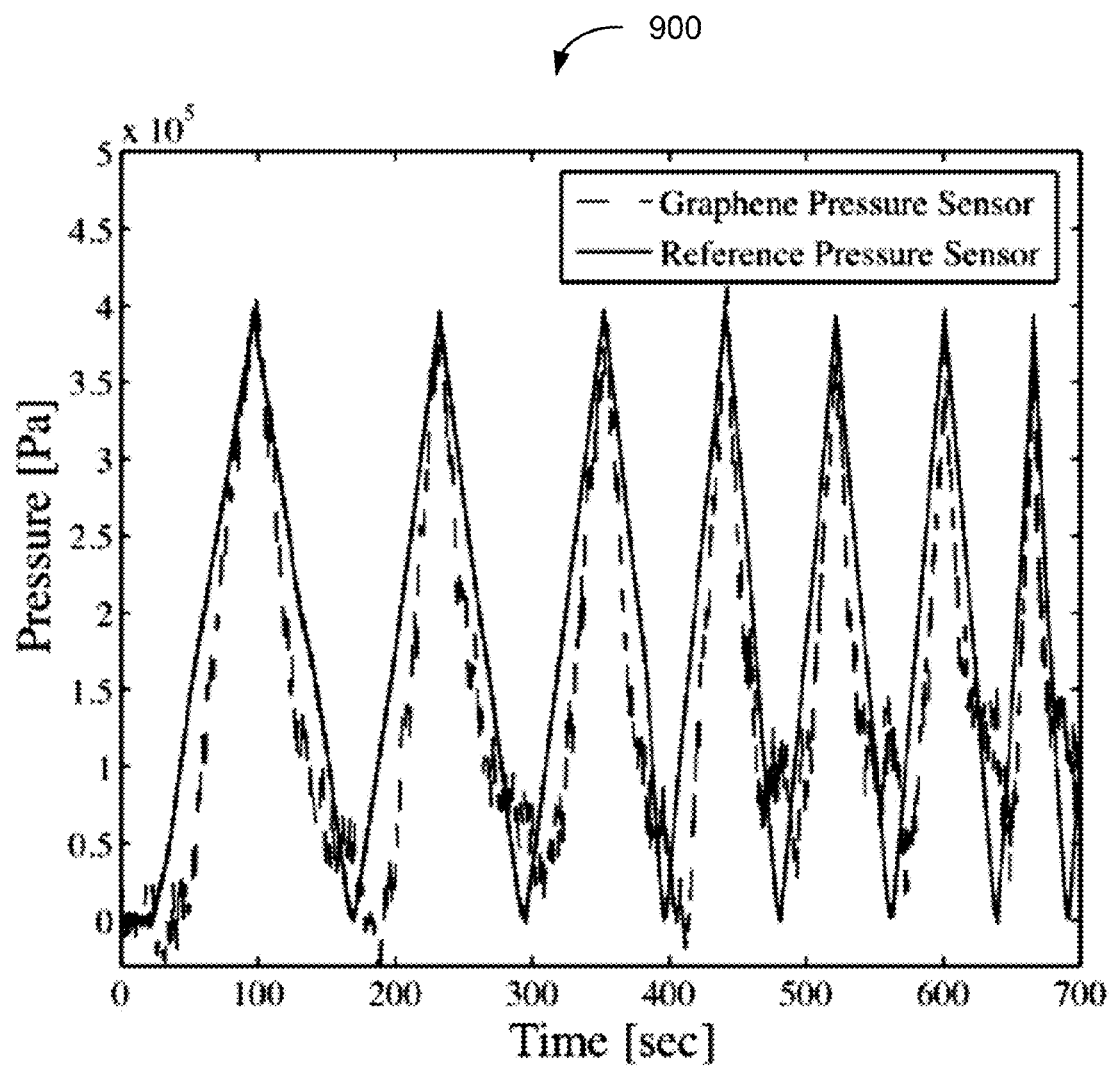
FIG. 9 is a chart of pressure cycle results for another embodiment of a two dimensional material-based pressure sensor.

Despite the deviation between the measured and anticipated pressure response, the measured response may be repeatable, which may be essential for device applications. FIG. 9 is a chart 900 of pressure cycle results for another embodiment of a two dimensional material-based pressure sensor. In FIG. 9, the response of the graphene-based pressure sensor is compared to the reference transducer for twelve (12) minutes of pressure cycling from atmospheric pressure to 414 kPag (60 psig) with a gate voltage of zero volts (0 V). Using a sensitivity value based upon an initial linear fit, the graphene sensor output is converted to pressure for clear comparison to the known reference sensor.

Figure 10:
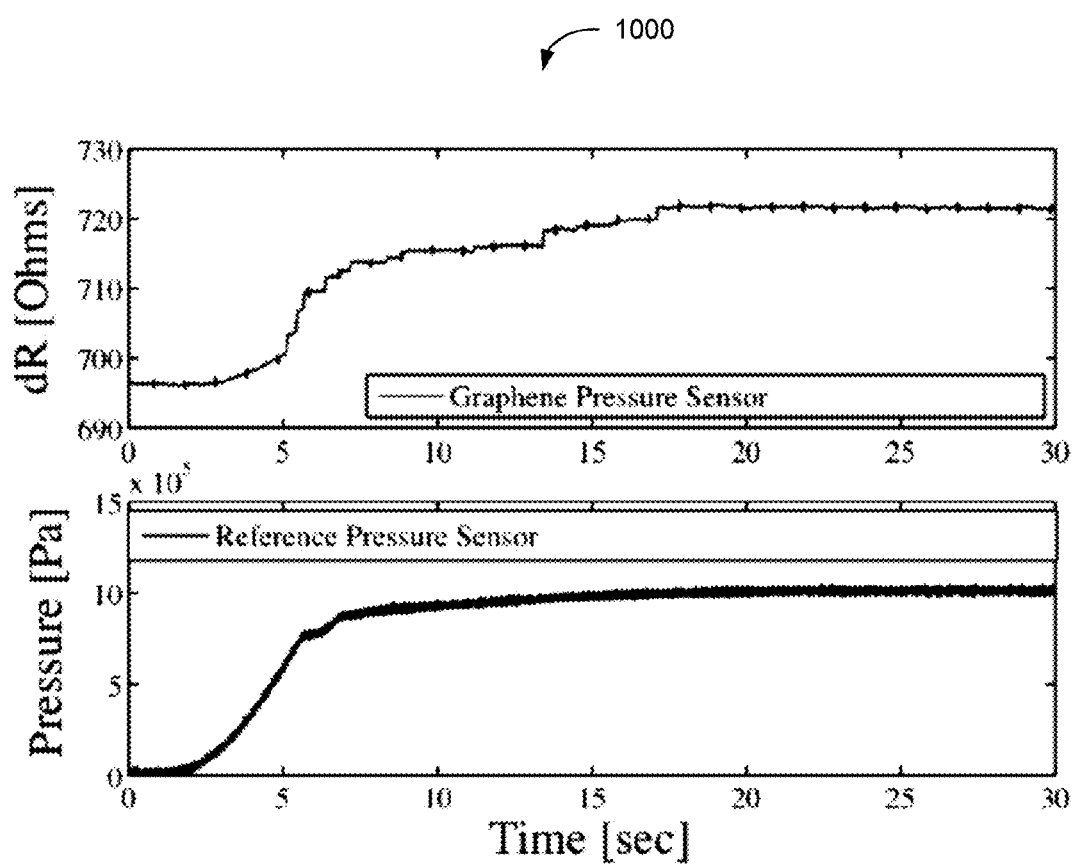
FIG. 10 shows charts of high static pressure and corresponding resistance changes results for another embodiment of a two dimensional material-based pressure sensor.

Additional pressure tests were conducted to higher pressures (about 1 MPa) and held for several minutes. For example, FIG. 10 is a chart 1000 of high static pressure results for another embodiment of a two dimensional material-based pressure sensor. This data demonstrates that the change in resistance of the graphene device may scale with applied pressure. It also shows small step changes in resistance at these higher pressures, which were irreversible when the pressure was released. These step changes may be due to graphene membranes ripping or collapsing under overloading, as confirmed by post testing SEM images showing a significant number of damaged membranes in the device.

In accordance with various example implementations of the disclosed technology, certain nano-scale, transconductive graphene pressure sensors may utilize graphene's mechanical and electrical properties. These graphene-based pressure sensors exhibit a linear increase in resistance with pressure. Furthermore, these devices demonstrate a repeatable response to pressure, which is essential for practical, functional devices. With improvements in fabrication, graphene pressure sensors have great potential as high sensitivity pressure transducers. These results demonstrate the potential for graphene to be utilized to fabricate pressure sensors with substantially reduced device dimensions, essential for applications requiring high spatial resolution of pressure measurements.

Example embodiments disclosed herein include a sensor device, measurement system, and/or sensor array that can include one or more sensors fabricated on one or more substrate structures. According to an example implementation of the disclosed technology, the substrate can include a back-electrode, a conductive layer, in communication with the back-electrode, and an insulating layer coupled to the conductive layer. The insulating layer may include one or more cavity regions. The sensor device, measurement system, and/or sensor array includes a sensor membrane comprising a two-dimensional material and disposed adjacent to the insulating layer and covering at least one of the one or more cavity regions. For example, the sensor membrane may be made from one or more materials such as graphene, MoS2, and TiS2. In certain example implementations, the sensor membrane is configured to respond to pressure changes. The sensor device, measurement system, and/or sensor array may include a first sensing electrode in electrical communication with a first region of the sensor membrane, and a second sensing electrode in communication with a second region of the sensor membrane.

In accordance with certain example implementations of the disclosed technology, a piezoresistive response of the sensor membrane may be detected via the first and second sensing electrodes. In accordance with certain example implementations of the disclosed technology, a capacitive response of the sensor membrane may be detected via the back electrode and at least one of the first and second sensing electrodes. For example, the back-electrode may be configured for measuring a capacitance change relative to the first or second sensing electrode based on pressure-induced deflection of the sensor membrane. In certain example implementations, the back-electrode may be configured to accept a voltage potential relative to the first or second sensing electrode for controlling an electric field associated with the sensor membrane. In accordance with certain example implementations of the disclosed technology, a transconductive response of the sensor membrane may be detected via a resistance change in the sensor membrane due to the change in distance between the electric field created by the back electrode and the sensor membrane. For example, the sensor membrane may be configured to measure a resistance change via a transconductive response of the material as the pressure-induced deflection of the sensor membrane reduces the distance between the sensor membrane and the back-electrode, which may be held at a controlled voltage. This transconductive sensing mechanism may result in substantial changes in the resistance (conductivity) of the sensor membrane as the carrier concentration, mobility and electrical properties of the sensor membrane change with pressure-induced deflection and resulting interaction with the electric field. Thus, in certain example implementations, the back electrode is configured to accept a controlled voltage for producing an electric field, and the sensor membrane is configured to produce a transconductive resistance change responsive to a pressure-induced deflection of the sensor membrane and a corresponding interaction of the sensor membrane with the electric field.

In accordance with an example implementation of the disclosed technology, the one or more cavity regions of the sensor device, measurement system, and/or sensor array can include an array of holes, trenches, or the like in the insulating layer. In certain example implementations, the holes in the insulating layer can include cylindrical or similarly shaped voids having diameters of between about 10 nanometers and about 20 micrometers. In certain example implementations, the size of the voids may be set to correspond to a desired frequency response of the sensor.

Certain example embodiments of the substrate may include various materials, including but not limited to silicon, doped silicon, silicon dioxide, hafnium oxide, silicon nitride, boron nitride, metal, etc. In certain example implementations, flexible materials such as flexible polymer may be utilized in fabricating flexible sensor devices, measurement systems, and/or sensor arrays, according to example implementations of the disclosed technology.

As disclosed herein, at least a portion of a periphery of the sensor membrane may be affixed to the insulating layer. In certain example embodiments, the sensor membrane may be affixed to entire peripheries of the one or more cavity regions, thereby effectively sealing the one or more cavity regions. For example, in certain embodiments having an array of holes in the insulating layer (as shown in FIG. 3F), the sensor membrane may be affixed to a portion or all of the top surface of the insulating layer and around the hole peripheries, but not in void portions of holes. In this example implementation, the sensor membrane may be suspended over the holes, and sealed at the peripheries of the holes, thereby forming multiple pressure-sensitive regions. These example embodiments may provide one or more advantages such as: (1) enhanced support to the sensor membrane by virtue of the small suspended region of the sensing membrane over the small holes; (2) increased frequency response of the device by virtue of the small cavity formed by the sensing membrane sealing the small hole(s); and (3) enhanced signal response due to the multiple sensing cavities.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although this disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned two-dimensional material-based pressure sensor, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A sensor device comprising:
   a substrate that includes:
      a back-electrode;
      a conductive layer, in communication with the back-electrode; and
      an insulating layer coupled to the conductive layer, the insulating layer comprising one or more cavity regions;
   a sensor membrane comprising a two-dimensional material and disposed adjacent to the insulating layer and covering at least one of the one or more cavity regions;
   a first sensing electrode in electrical communication with a first region of the sensor membrane; and
   a second sensing electrode in communication with a second region of the sensor membrane;
   wherein the sensor membrane is configured to respond to pressure changes exerted on the sensor device.

2. The sensor device of claim 1, wherein the back-electrode is configured to measure a capacitance change relative to the first or second sensing electrode based on pressure-induced deflection of the sensor membrane.

3. The sensor device of claim 1, wherein the back electrode is configured to accept a controlled voltage for producing an electric field, and wherein the sensor membrane is configured to produce a transconductive resistance change responsive to a pressure-induced deflection of the sensor membrane and a corresponding interaction of the sensor membrane with the electric field.

4. The sensor device of claim 1, wherein the back-electrode is configured to accept a voltage potential relative to the first or second sensing electrode for controlling an electric field associated with the sensor membrane.

5. The sensor device of claim 1, wherein the one or more cavity regions comprise an array of holes in the insulating layer.

6. The sensor device of claim 5, wherein the holes comprise cylindrical voids having diameters of between about 10 nanometers and about 20 micrometers.

7. The sensor device of claim 1, wherein the sensor membrane comprises a material made from one or more of graphene, $MoS_2$, and $TiS_2$.

8. The sensor device of claim 1, wherein the substrate comprises one or more of silicon, doped silicon, silicon dioxide, hafnium oxide, silicon nitride, boron nitride, metal, and a flexible polymer.

9. The sensor device of claim 1, wherein at least a portion of a periphery of the sensor membrane is affixed to the insulating layer.

10. The sensor device of claim 1, wherein the one or more cavity regions comprise an array of trenches in the insulating layer.

11. The sensor device of claim 1, wherein the sensor membrane comprises a two-dimensional material having a thickness dimension of one atom.

12. A sensor system comprising:
   a measurement circuit;
   a sensor in communication with the measurement circuit, the sensor comprising:
      a substrate comprising:
         a back-electrode;
         a conductive layer, in communication with the back-electrode; and
         an insulating layer coupled to the conductive layer, the insulating layer comprising one or more cavity regions;
      a sensor membrane comprising a two-dimensional material and disposed adjacent to the insulating layer and covering at least one of the one or more cavity regions;
      a first sensing electrode in electrical communication with a first region of the sensor membrane; and
      a second sensing electrode in communication with a second region of the sensor membrane;
      wherein the sensor membrane is configured to respond to pressure changes exerted on the sensor membrane.

13. The sensor system of claim 12, wherein the back-electrode is configured to measure a capacitance change relative to the first or second sensing electrode based on pressure-induced deflection of the sensor membrane.

14. The sensor device of claim 12, wherein the back electrode is configured to accept a controlled voltage for producing an electric field, and wherein the sensor membrane is configured to produce a transconductive resistance change responsive to a pressure-induced deflection of the sensor membrane and a corresponding interaction of the sensor membrane with the electric field.

15. The sensor system of claim 13, wherein the at least one back-electrode is configured to accept a voltage potential from the measurement circuit relative to the first or second sensing electrode for controlling an electric field associated with the sensor membrane.

16. The sensor system of claim 12, wherein the one or more cavity regions comprise an array of holes in the insulating layer.

17. The sensor system of claim 16, wherein the holes comprise cylindrical voids having diameters of between about 10 nanometers and about 20 micrometers.

18. The sensor system of claim 12, wherein the sensor membrane comprises a material made from one or more of graphene, $MoS_2$, and $TiS_2$.

19. The sensor system of claim 12, wherein the substrate comprises one or more of silicon, doped silicon, silicon dioxide, hafnium oxide, silicon nitride, boron nitride, metal, and a flexible polymer.

20. The sensor system of claim 12, wherein at least a portion of a periphery of the sensor membrane is affixed to the insulating layer.

21. The sensor system of claim 12, wherein the one or more cavity regions comprise an array of holes in the insulating layer, and a wherein a diameter distribution of the holes is configured to affect a frequency response of the sensor system.

22. The sensor device of claim 12, wherein the one or more cavity regions comprise an array of trenches in the insulating layer.

23. A sensor array system comprising:

at least one measurement circuit; and an array of sensors in communication with the at least one measurement circuit, the array of sensors comprising two or more sensors, each of the two or more sensors comprising:

a substrate comprising:

a back-electrode;

a conductive layer, in communication with the back-electrode; and an insulating layer coupled to the conductive layer, the insulating layer comprising one or more cavity regions;

a sensor membrane comprising a two-dimensional material and disposed adjacent to the insulating layer and covering at least one of the one or more cavity regions;

a first sensing electrode in electrical communication with a first region of the sensor membrane; and a second sensing electrode in communication with a second region of the sensor membrane;

wherein the sensor membrane is configured to respond to pressure changes exerted on the two or more sensors.

24. The sensor array system of claim 23, wherein the back-electrode is configured to measure a capacitance change relative to the first or second sensing electrode based on pressure-induced deflection of the sensor membrane.

25. The sensor array system of claim 23, wherein the back electrode is configured to accept a controlled voltage for producing an electric field, and wherein the sensor membrane is configured to produce a transconductive resistance change responsive to a pressure-induced deflection of the sensor membrane and a corresponding interaction of the sensor membrane with the electric field.

* * * * *